ELECTRONIC SWITCHING SYSTEM AND LINE CIRCUIT THEREFOR

Original Filed Jan. 30, 1961 9 Sheets-Sheet 1

INVENTOR.
Donald K. Melvin

ELECTRONIC SWITCHING SYSTEM AND LINE CIRCUIT THEREFOR

Original Filed Jan. 30, 1961 9 Sheets-Sheet 2

INVENTOR.
Donald K. Melvin

ELECTRONIC SWITCHING SYSTEM AND LINE CIRCUIT THEREFOR

Original Filed Jan. 30, 1961 9 Sheets-Sheet 3

INVENTOR.
Donald K. Melvin

ELECTRONIC SWITCHING SYSTEM AND LINE CIRCUIT THEREFOR

Original Filed Jan. 30, 1961 9 Sheets-Sheet 1

INVENTOR.
Donald K. Melvin

ELECTRONIC SWITCHING SYSTEM AND LINE CIRCUIT THEREFOR

Original Filed Jan. 30, 1961 9 Sheets-Sheet 5

INVENTOR.
Donald K. Melvin

ELECTRONIC SWITCHING SYSTEM AND LINE CIRCUIT THEREFOR

Original Filed Jan. 30, 1961 9 Sheets-Sheet 6

INVENTOR.
Donald K. Melvin

INVENTOR.
Donald K. Melvin

ELECTRONIC SWITCHING SYSTEM AND LINE CIRCUIT THEREFOR

Original Filed Jan. 30, 1961 9 Sheets-Sheet 8

INVENTOR.
Donald K. Melvin

ELECTRONIC SWITCHING SYSTEM AND LINE CIRCUIT THEREFOR

Original Filed Jan. 30, 1961 9 Sheets-Sheet

INVENTOR
DONALD K. MELVIN
BY
ATTY.

United States Patent Office

Re. 26,227
Reissued June 27, 1967

26,227

ELECTRONIC SWITCHING SYSTEM AND LINE CIRCUIT THEREFOR

Donald K. Melvin, Menlo Park, Calif., assignor to Automatic Electric Laboratories, Inc., Northlake, Ill., a corporation of Delaware Original No. 3,136,863, dated June 9, 1964, Ser. No. 85,741, Jan. 30, 1961. Application for reissue Aug. 10, 1964, Ser. No. 402,672

11 Claims. (Cl. 179—18)

Matter enclosed in heavy brackets [ ] appears in the original patent but forms no part of this reissue specification; matter printed in italics indicates the additions made by reissue.

This invention relates to an electronic switching system and a line circuit arrangement therefor, and more particularly to an arrangement for use in a system in which time division multiplex control and scanning of the line circuits is used.

It is the general object of this invention, in an electronic switching system using time division multiplex scanning of the line circuits, to provide simple and effective arrangements for the transmission of supervisory information such as hook-switch signals, class of service signals, dialing signals, dial tone, and busy tone.

With multiplex scanning, the sampling rate may be too slow to permit the accurate regeneration of dial pulses for repeating over a trunk line to a distant exchange.

In systems using electronic crosspoint devices for voice path switching, a problem is encountered in supplying supervisory tone signals to the subscriber lines, because it is difficult to fire more than one crosspoint device connected to and fanning out from the same mode.

According to the invention, a time division multiplex line scanning arrangement is provided with two common supervisory signal leads connected between the common control equipment and all of the line circuits, so arranged that each line circuit during its time slot may transmit any one of four items of supervisory information over the two common signal leads to the common control equipment. The four items of information may for example comprise (1) an on hook condition, (2) an unrestricted line off hook, (3) a restricted line off hook, and (4) an unequipped line.

According to another feature of the invention, each line circuit is provided with an individual tone gate for coupling dial tone to the subscriber line, under the control of a signal from the common control equipment; and with an arrangement for notifying the calling subscriber of a busy condition by interrupting the control signal so that interrupted dial tone is transmitted over the subscriber line.

According to still another feature of the invention, an arrangement is provided using a signal tone gate in each line circuit and a tone detector in each trunk circuit to repeat dialing signals as alternating current tone through the switching network, which is detected in the trunk circuit and repeated in suitable form over the trunk line to the distant exchange.

Figure 1:
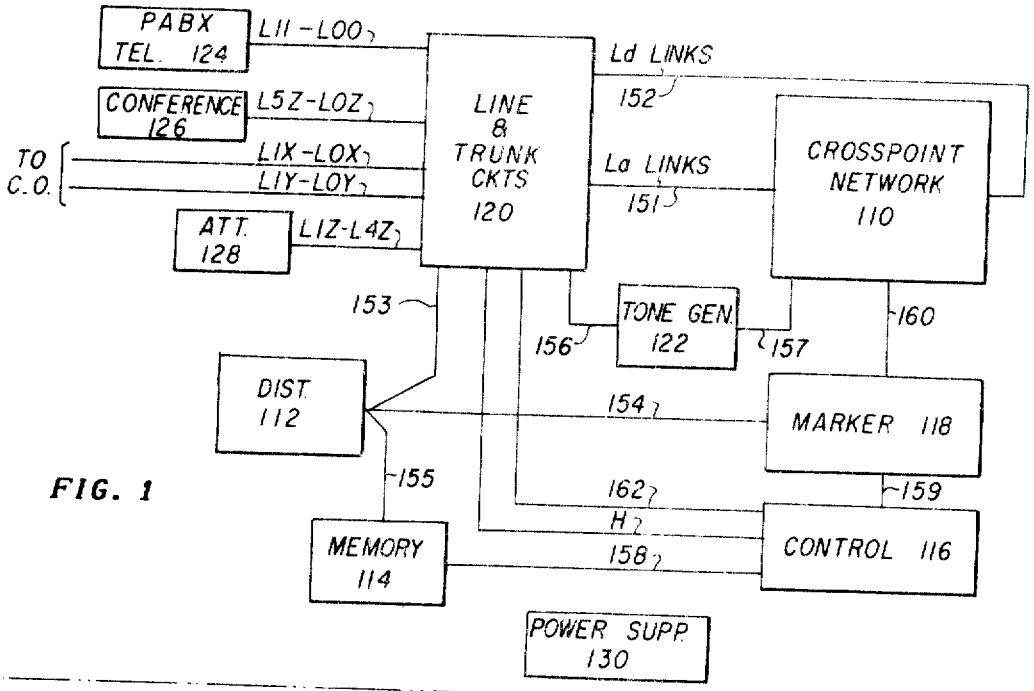
Figure 2:
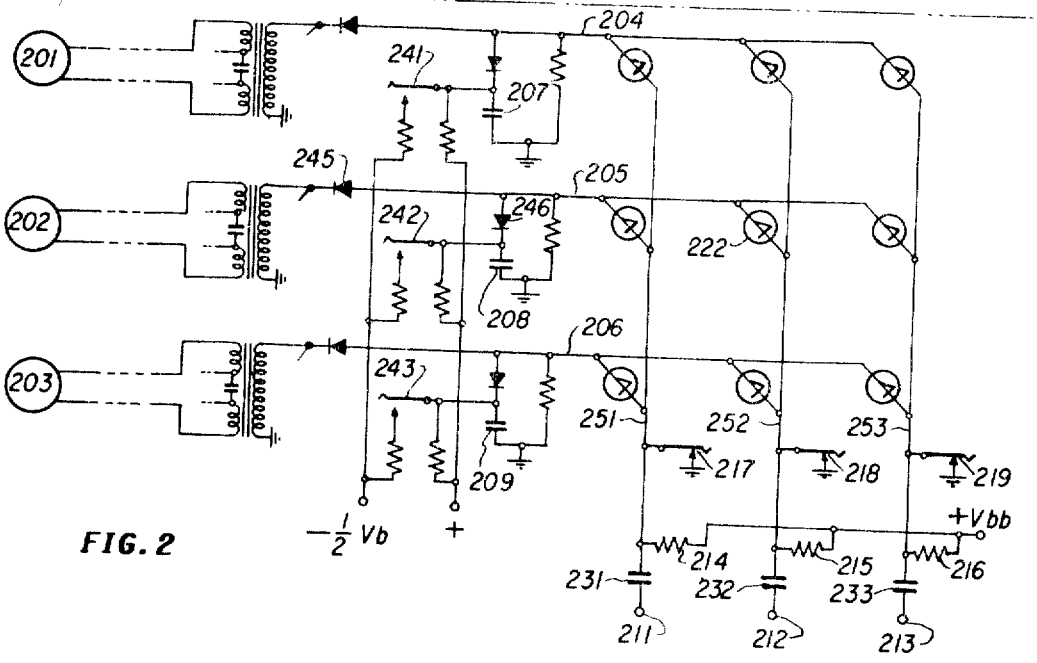
Figure 3:
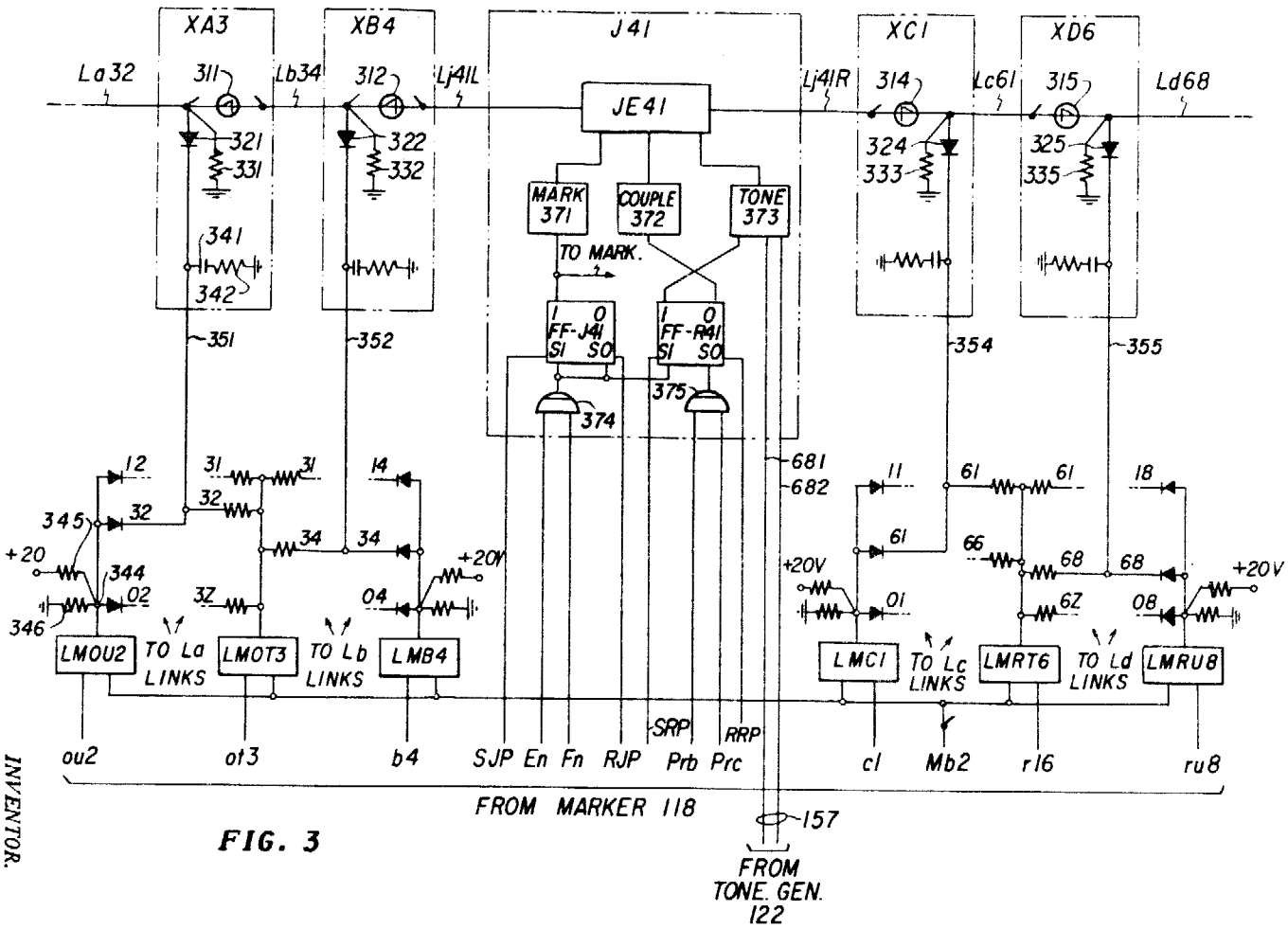
Figure 4:
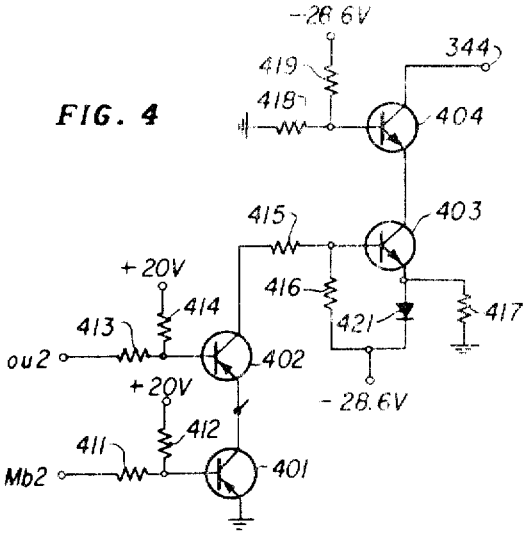
Figure 5:
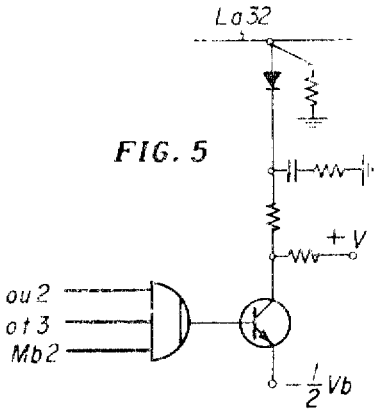
Figure 6:
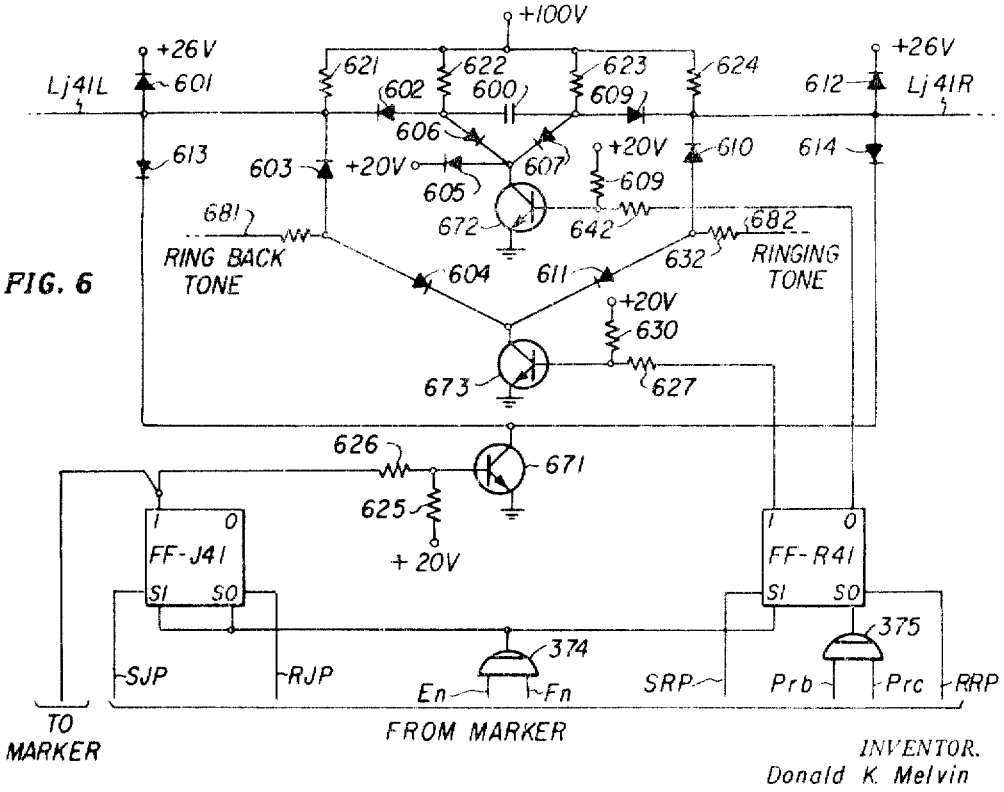
Figure 23:
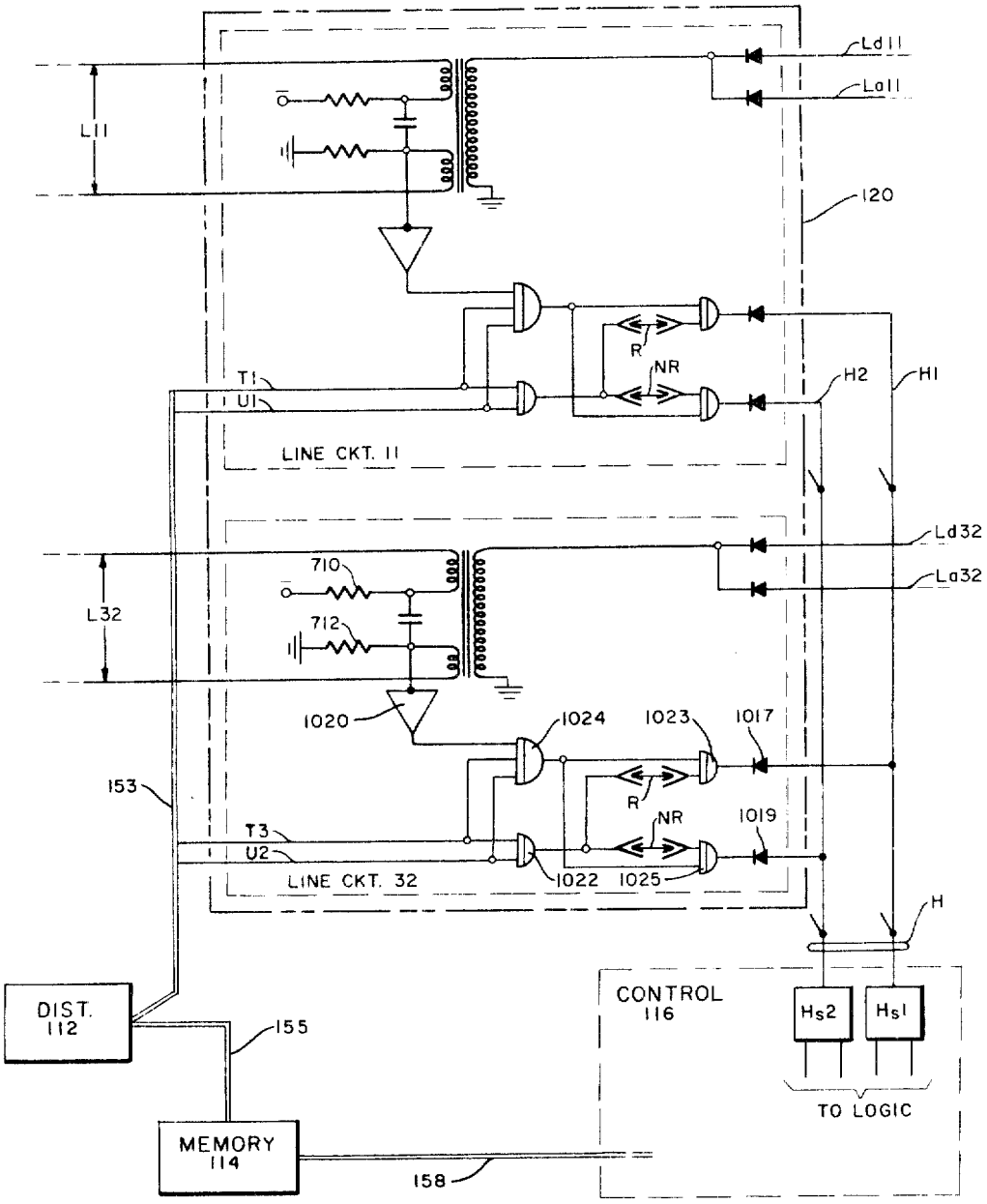

In the accompanying drawings comprising FIGS. 1 to [22] *23*: FIG. 1 is a block diagram of a private automatic branch exchange; FIG. 2 is a schematic diagram of a simplified crosspoint matrix; FIG. 3 is a symbolic and functional block diagram of a typical connection through the crosspoint switching network; FIG. 4 is a schematic diagram of a link marker; FIG. 5 is a simplified diagram of the link marking arrangement; FIG. 6 is a schematic diagram of a junctor circuit; FIGS. 7–11 are functional block and schematic diagrams of line and trunk circuits; FIG. 12 is a symbolic diagram depicting the form of the principal storage areas within the marker; FIGS. 13–22 are symbolic block diagrams showing typical connection arrangements through the switching network; *and FIG. 23 is a functional block diagram showing the connection of the common supervisory conductors from the line circuits to the control equipment.*

GENERAL DESCRIPTION

It has been chosen to describe the invention as embodied in a 100-line private automatic branch exchange, as shown in FIG. 1 by a block diagram. The system is generally similar to the isolated private automatic exchange disclosed in a copending United States patent application by John G. Van Bosse for an Electronic Switching System, Serial No. 845,901, filed October 12, 1959, *now Patent No. 3,133,154.* To meet the requirements of a PABX, equipment has been added to provide supervisory signals, conference access, and trunk circuits.

As shown in FIG. 1, the PABX serves one hundred local lines L11–L00, ten PBX trunks L1X–L0X, ten two-way dial trunks L1Y–L0Y, six lines L5Z–L0Z for a meet-me conference circuit, and four operator circuits L1Z–L4Z to an attendant's cabinet 128. Transmission paths between these lines may be selectively established by way of the line and trunk circuits 120 and a crosspoint network 110. The exchange provides trunk transfer facilities, trunk restriction for selected subscribers, and night service. There are direct trunk facilities which allow the operator to link her telephone directly to a trunk, thereby bypassing the electronic exchange in the event of malfunction. The telephones for the PABX subscribers are conventional telephone instruments modified for tone ringing. A three-digit number scheme is used in which the first digit is used to access the particular service desired. The digit 6 is for local calls, digit 8 for conference, digit 9 for trunks, and digit 0 for operator service. The exchange uses semiconductor components including diodes and transistors. The crosspoint elements of the network 110 are four-layer diodes.

The Distributor

The control actions in this system are on a time-division basis. The distributor 112 is a pulse train generator which supplies a series of pulses to synchonize the different parts of the system. Since it is an independent unit, receiving no input from other parts of the system, it is able to generate independent commands, assuring the execution of logical operations in the proper sequence.

A wide variety of pulse-trains are produced and fed as separate outputs to the rest of the system. Each pulse-train has a specific position in time with respect to each other pulse-train. In this manner, a certain period of time can be defined by the presence of one or more of the pulses.

This PABX has 130 time slots, each slot being 123 microseconds long. The time slots are divided between one hundred local subscribers, twenty trunks, four operator circuits, and six conference circuits. The system cycle is 16 milliseconds. (130 time slots times 123 microseconds). The distributor generates the following pulses:

(1) Tens pulses, equal to 13 time slots (1.6 milliseconds).

(2) Units pulses, equal to 1 time slot (123 microseconds).

(3) Interval pulses, equal to 7.7 microseconds.

The Memory

This PABX employs a ferrite-core temporary memory 114 of 130 words that is, a word is assigned to each PABX subscriber, trunk, operator, and conference circuit. Each word has 31 bits which gives various information about the status of the subscriber (or trunk, operator, or conference circuit).

The Marker

The marker 118, a decision making intermediary between PABX subscribers and the switching network, is a logical network which may be considered to be stationary with respect to the periodic time reference established by the distributor 112. It is capable of reviewing the status of each subscriber in turn. Basically, the marker 118 is the means by which information is conveyed from one subscriber time slot to another, and is the logical network that supervises the establishment and termination of audio paths through the switching network.

The marker 118 consists of a number of bistable storage and coding devices (flip-flops), logic building blocks (NOR gates), a parity checker, and translation matrices. The parity checker is a comparison network that yields an output signal when the input from one source is found to be identical with the input from a second source. Information is supplied to the switching network in different codings. Consequently, a translation matrix is used to translate these different codes and subsequently transfer this translated information to the switching network

Subscriber Logic

The subscriber logic control unit 116 is a NOR-gate logical network, the function of which is to convert the information in the ferrite-core memory 114 in each subscriber's time slot into a form descriptive of the condition of the subscriber. It also acts on this information, and on the marker information, and multiplex highway information, in such a manner as to determine what information should be written into the memory at the end of each time slot. Subscriber logic is used by each subscriber during the time assigned him.

Subscriber logic is composed of bi-stable storage elements (flip-flops) and logic building-blocks (NOR gates).

Switching Network

The purpose of the switching network 110 is to provide a means of establishing and maintaining an audio connection between selected lines and trunks. The network consists of a four-stage crosspoint array which uses PNPN diodes as crosspoint switches. Each stage consists of groups of matrices made up of vertical and horizontal rows of connections where a PNPN diode is connected at each crosspoint. Each subscriber's line equipment is connected to both ends of the network so that a subscriber may act as either a calling party or a called party, or both. A split junctor is used in the center of the network for applying part of the potentials to the crosspoints, gating the ringback and ringing signals, and supplying the necessary holding current to the PNPN diodes. In addition, the switching network provides the facilities for breaking down the audio connection, once the subscribers have concluded their conversation.

Line Equipment

Each PABX subscriber, PBX trunk, Two-way Dial trunk, Operator circuits and Conference circuit has an associated line circuit in block 120. The line circuit terminates the line loop and also provides an audio connection to the crosspoint switching network. The line circuit has sensing elements that reflect the conditions of the line loop; by opening and closing the line loop with either the hookswitch or dial springs, a subscriber may make his intentions known. The line circuit also determines when certain supervisory signals should be supplied to a subscriber.

Trunk Circuits

There are facilities for ten two-way dial trunks (permitting in- and out-dialing) and ten PBX trunks (on which all incoming calls are directed to the attendant cabinet). Associated with the trunks are a number of NOR gates (flip-flops, relay drivers and relays. These components and circuits are arranged in such a way as to enable the electronic PABX to function with the electromechanical, step-by-step, central office.

Only unrestricted subscribers may dial directly over trunks to the central office. A restricted subscriber may obtain a trunk via the operator.

Incoming PBX trunks are always directed to the operator unless night service facilities are provided. Two-way dial trunks may dial directly into the PABX.

Attendant Cabinet

In this system, the attendant cabinet is a cordless, desk-mounted, turret-type cabinet. Besides providing regular attendant service on incoming calls, it provides night service, conference, transfer, and intercept facilities.

There are four operator positions, each comprising a conference key, a three-position answer key (normal, answer, and hold) and two lamps (local and trunk) which flash when the operator action is desired and burn steadily when attendant answers.

Power Supply

The transistorized power supply was designed to provide a number of regulated voltages with suitable means of monitoring, sequencing, and protection to insure reliable operation.

The system draws its power from the A.C. mains. A line-voltage regulator eliminates the voltage fluctuations normally encountered on the mains, hence the series voltage regulators can be made to operate more marginally with respect to input voltage and higher efficiency of the supply is maintained. The regulated D.C. voltages are of two categories, critical and non-critical. Both types are applied to the exchange through power switching devices. The start-stop operation of the control equipment is sequential, and provides that the non-critical voltages are never present on the exchange buses in the absence of the critical voltages. A power-monitoring panel is used to determine the accuracy of all voltages. A voltage-sensing circuit provides automatic protection against excessive deviations in the critical voltages.

CROSSPOINT NETWORK

FIG. 2 is a symbolic showing of a typical 3 x 3 matrix of crosspoints. Each horizontal input lead terminates in a transformer winding, representing a subscriber's line transformer. The vertical output leads are connected via respective resistors 214, 215, 216 to a positive voltage source Vbb. The switches 217, 218, 219 on the crosspoint side of the resistors permit these points to be switched to ground. The capacitors 231, 232, 233 provide outputs to other circuits. The switches 241, 242, 243 shown appear on the respective subscribers' links and serve to supply a negative potential.

The circuit operates as follows: Assume subscriber 202 is to be connected to output 212. The first action is the marking of the subscriber link. Switch 242 is operated, causing line 205 to go negative. The slow rise time is due to the capacitor 208, and is provided to minimize false firing due to "rate effect."

Three PNPN diodes are now seen to be marked with −½ Vb on their cathodes. Since the connection is to be to link 252, switch 218 is operated, permitting the potential on link 252 to rise toward Vbb. As soon as PNPN diode 222 sees its full breakdown it turns on. The capacitor 208 charges towards the positive potential determined by the voltage-divider. As soon as the potential on link 205 rises above ground, diode 245 starts conducting and link 205 is held close to ground, as determined by the direct voltage drop of the transformer winding and diode 245. Switch 242 is then returned to its original position, causing the capacitor 208 to charge positively, reverse-biasing diode 246 and electrically removing the link marking circuit from the link. Assuming resistor 215 has been selected small enough to provide the holding current for the PNPN diode, it will remain in its "on" state and the connection is established.

Assuming a one-volt drop in the transformer winding and diode 245, the potential on link 205 will be a positive one volt. Adding the drop across the PNPN diode, the potential on link 252 will be two volts positive.

At the termination of the call a crosspoint is returned to its "off" state by the operation of the switch 218 which supplied the positive firing potential. Returning this switch 218 to its ground signal diverts the holding current of the crosspoint to ground and it reverts to its "off state."

To form the network 110 several of these matrices are connected together. As in the original PAX, the network used here is a four-stage network, symmetrical about a center junctor. The junctor serves to join the two halves of the network, and supplies the positive half of the crosspoint breakdown voltage. FIG. 3 is a schematic and block diagram of the four-stage network 110. Only one of the matrices of each stage is shown, and in each matrix only one input link and one output link and the crosspoint diode between them is shown. It should be noted that each subscriber appears on both sides of the network. The system control requires that all calls originate on the left side of the network (XA matrix) and terminate on the right side (XD matrix). The two inner matrices are designated XB and XC (left and right of center, respectively). The fact that each subscriber's line equipment has two connections into the transmission network permits the subscriber to be connected as both a calling and a called party. This inturn has many benefits, for it permits such features as chain conference calls, trunk transfer, operator intercept, etc. The full network 110 has ten XA, six XB, six XC, and ten XD matrices; and thirty-six junctors. Each XB matrix has a junctor common to each XC matrix. Each XA and XD matrix is a 13 x 10 coordinate crosspoint array; and each XB and XC matrix is a 10 x 6 array.

A subscriber address (number) is a two-digit number and is determined by which XA and XD matrix the subscriber is in, and his position in the matrix. Thus a subscriber located in XA matrix 2 in the third level, would have his address formed by tens digit 2 and units digit 3, which is simply 23. Similarly the junctor address is a two-digit number based on the number of the XB and XC matrices it connects; the first digit refers to the XB matrix, the second to the XC. Thus a junctor joining XB matrix 1 to XC matrix 2 would be addressed as 12. Any subscriber can be connected to any other subscriber, using any junctor.

As shown in FIG. 3, the switching network 110 includes a number of link markers for controlling the marking potential applied to the individual links to establish a connection. There are six sets of such link markers, one marker of each set being shown on the drawing. The selection of the calling line is controlled by originating units and ten markers such as LMOU2 and LMOT3. The selection of the called line is controlled by terminating tens and units markers such as LMRT6 and LMRU8. The selection of the junctor is controlled by markers such as LMB4 on the left side of the network, and markers such as LMC1 on the right side of the network. All of these link markers are identical, and one of them, LMOU2, is shown by a schematic diagram in FIG. 4. A simplified equivalent circuit of the equipment for marking one link, La32, is shown in FIG. 5.

The network includes thirty-six junctors, one of which, J141, is shown in FIG. 3. The junctor includes an equipment unit JE41, three transistor switch units 371, 372 and 373; two flip-flops FF–J41 and FF–R41; and two input AND gates 374 and 375. The junctor is shown in functional block and schematic diagram in FIG. 6. The mark switch 371, comprising transistor 671, is used to control the marking of the junctor link LJ41 to both sides of the network. The tone switch 373, comprising transistor 673, is used to control the connection of ringback and ringing tone to the network. The couple switch 372, comprising transistor 672, is used to control the decoupling of the two halves of the junctor link during ringing.

Link Markers

Each of the links is marked by way of a sub-link. For example link LA32 has associated therewith a sub-link comprising conductor 351, diode 321, resistor 331, capacitor 341, resistor 342, a diode connection to marker LMOU2, and a resistance connection to marker LMOT3. Functionally, each link marker receives switching commands from the marker, and delivers a marking voltage to the sub-links. When both link markers common to a sub-link supply this voltage to the sub-link, conditions are correct for the sub-link to apply $-Vb/2$ to its associated link. Each units link marker such as LMOU2, and each B link marker such as LMB4, is connected through respective diodes to a plurality of sub-links; and each tens link marker such as LMOT3 is connected through respective resistors to a plurality of sub-links. Also each units, B, and C link marker has its output terminal connected through a resistor such as 345 to +20 volts, and through a resistor such as 346 to ground. The tens links markers are also connected to this +20 volt source by way of the several diodes and resistors connecting the link markers to the sub-links. Referring now to the schematic diagram in FIG. 4 of the link marker LMOU2, the input Mb2 is the A.C. command to the link marker. The A.C. command is the signal which conveys the information as to when the circuit is to operate. Input ou2 receives the addressing command; this command designates which circuit is to operate. The transistor 401 is common to a group of link markers. In the steady state condition, the two inputs are at ground potential, and thus transistors 401 and 402 are held in the OFF state. It should be noted that these transistors comprise a transistor AND gate. Resistor 417 and diode 421 form a self-bias network for transistor 403 causing its emitter to be more positive than its base. Thus, transistor 403 is held in the OFF state. The resistance divider 418, 419 keeps the base of transistor 404 negative with respect to the off voltage at the collector of transistor 403. Thus transistor 404 is held off and the final steady state voltage at the collector of transistor 404 is a positive potential.

When inputs ou2 and Mb2 are simultaneously at −10 volts potential, transistors 401 and 402 are turned on and the collector voltage of transistor 402 is close to ground. This forces the base potential of transistor 403 to go positive with respect to its emitter, and transistor 403 turns on. Transistor 404 follows suit and the negative marking potential appears at its collector. It is this negative voltage which is an input to the sub-link.

The sub-link circuit takes the inputs from the link markers and applies the negative marking potential to the link. Referring to the sub-link for link La32 in FIG. 3, it may be seen that each of the link markers LMOU2 and LMOT3 may have either a positive or a negative output signal, making four possible combinations. One of the functions of the sub-link it to act as an AND gate to mark its associated link only when the signals from both associated link markers are negative.

The sub-link must be electrically isolated from the link except when the link is actually being marked. To accomplish this, during the time the link is not being marked, the cathode of diode 321 is always kept at a potential more positive than the maximum positive potential experienced by the link. Another requirement on the sub-link is that the marking potential be applied to the link rather slowly. This is to avoid firing crosspoints which are particularly rate sensitive. These various requirements are met as follows: For the unmarked case neither of the link marker inputs are negative, and the resistive voltage divider comprising resistor 345 and 346 is providing a positive potential sufficient to maintain diode 321 reverse biased. For the case where only the tens input is negative, the potential at the cathode of diode 321 will drop as current flows from the divider 345, 346 via a diode and resistor to the tens link marker; however, the circuit has been designed so that the potential will remain sufficiently positive to keep diode 321 reverse biased. For the case when only the link marker LMOU2 is negative the diode connecting it to conductor 351 becomes reverse biased and the potential at diode 321 remains positive via other sub-link circuits having a common tens input with this circuit. When both inputs to the sub-link are negative the potential at the cathode of diode 321 will go slowly negative as capacitor 341 begins to charge via resistor 342 and the resistor connecting conductor 351 to the link marker LMOT3. The potential on conductor 351 is sufficient to maintain the diode connecting it to the link marker LMOU2 reverse biased. As capacitor 341 charges negatively diode 321 will be forward biased and the negative marking potential will be applied to the link. Resistor 331 serves to provide a leakage curent path for the crosspoint and aids in reducing crosstalk.

Junctor

Functionally the junctor (a) supplies the positive half-breakdown voltage to the selected crosspoints, (b) clamps the positive voltage to insure that it never exceeds a value sufficiently positive to fire crosspoints which are not marked with a negative potential, (c) gates ringing and ring-back tones on the transmission path (d) opens the audio connection across the junctor during ringing, and (e) provides the necessary holding current to the four-layer diodes. Refering to FIG. 6, the junctor contains one junctor flip-flop FF–J41 and one ringing flip-flop FF–R41. The junctor flip-flop controls transistor switch 671 which permits the application of marking voltage. The ringing flip-flop controls the tone gate transistor 672 and the transistor switch 673 which opens the audio path during ringing. The flip-flop D.C. commands (address) are supplied from AND gates 374 and 375. These gates are controlled by marker information and provide a means for selecting junctors. The trigger pulses to inputs SJP, RJP, SRP, and RRP, are furnished by marker controlled gated pulse amplifiers. The coincidence of both trigger and D.C. commands is required to change the flip-flop state.

The junctor is symmetrical about capacitor 600 and therefore the detailed description of one side will apply to the other side. Assume that initially the junctor is not being used in a connection. Both flip-flops are in the reset state. The output from the junctor flip-flop is near ground potential which biases transistor 671 into saturation. Transistor 671 provides a ground path for the +100 volts through resistors 621 and 622. The potential at the left end of the junctor link Lj41 is determined by the voltage drops across diode 613 and transistor 671. This side of the link is connected to a B crosspoint matrix, but the potential is too low to break down the four-layer diode even with negative half voltage on the opposite side. The ringing flip-flop has its "1" output near ground potential and biases transistor 673 into saturation. The tone generator supplies an A.C. signal superimposed on a positive D.C. level to the anode of diode 604 and transistor 673 places a ground potential on its cathode. The cathode of diode 603 is at the small positive potential established across diode 613 and transistor 671, and thus the tone finds a ground path through diode 604. The zero output of the ringing flip-flop is −10 volts which biases transistor 672 into cutoff.

At some subsequent time, the D.C. signals En, Fn, Prb, and Prc are true (−10 v.) and the A. C. command SJP sets the junctor flip-flop FF–J41. The output of this flip-flop is now −10 volts which biases transistor 671 into cutoff. The ground path from the +100 volt source no longer exists and the potential at the left end of the junctor link Lj41 rises toward the clamping voltage +26 volts through diode 601. Assuming that the link markers have applied negative potential, the crosspoints conduct. The holding current is supplied from the +100 volt source through resistor 621. When the A.C. trigger pulse on lead SRP sets the ringing flip-flop FF–R41, transistor 672 is biased into saturation. This permits current to flow from the +100 volt source via resistor 622, diode 606 and transistor 672 to ground. Voltage drops across diode 606 and transistor 672 produce a potential at the anode of diode 606 which reverse biases diode 602 and opens the audio path across capacitor 600. Transistor 673 is biased off and the signal from the tone generator proceeds via diode 603 to the crosspoint network. When the called party answers, the marker applies a signal to reset the ringing flip-flop FF–R41. Transistor 672 becomes cut off and completes the audio path across the junctor. At the same itme, transistor 673 is returned to saturation and removes the tone from the line by reverse biasing diode 603. Talking is now permitted through the junctor.

When the calling party hangs up the junctor flip-flop FF–J41 is reset and the junctor reverts to its idle state.

Operation of Network

The task of selecting which junctor is to be used for a particular call is performed by the marker 118 in an operation called "route selection." Assume the marker receives a request to connect subscriber 32 to subscriber 68, and that the route search has found the call may use junctor J41.

Initially, the junctor J41 is idle, flip-flop FF–J41 is in state "0" and supplies base current to transistor 671 which is in saturation. Transistor 671 carries currents from +100 v. through resistors 621 and 624 and diodes 613 and 614, so the pottential at link Lj41 is close to ground. The link markers are "off" and the idle links are also close to ground.

The first step in initiating a connection involves marking the selected links of the route. Since subscriber 32 is to be connected to the left-hand side of the network, marker outputs ou2 and ot3 are energized. Since the connection is to be routed over XB–4, the marker output b4 is energized. During the marking time, the marker-output Mb2 is also energized. This activates the link markers LMOU2, LMOT3, and LMB4, thereby marking the sublinks 351 and 352 and causing the voltage at links La32 and Lb34 to drop to −½Vb.

A little later the set input of flip-flop FF–J41 is energized by the addressing signals En and Fn and the connect command SJP from the marker. The flip-flop moves to state 1, cutting off transistor 671, and the voltage at link Lj41 starts rising toward +100 v. When the voltage reaches +½Vb the PNPN diode 312 breaks down and the voltage at link Lb34 rises. When this voltage reaches the value +½Vb, the PNPN diode 311 breaks down and the voltage at link La32 rises. When this voltage reaches ground, the diode in the line circuit starts conducting.

The marker next suppresses the marking command Mb2, turning off the link markers and reverse-biasing diodes 321 and 322. A connection is now established from junctor J42 to the line transformer of subscriber 31 through the PNPN diodes 312 and 311, and the link markers have been electrically removed from the links. At the same time a similar process initiates the connection in the right-hand half of the network between junctor J41 and the called subscriber. The four-layer diodes in both branches receive sustaining current through resistors 621 and 624 respectively. Voice-frequency currents are carried from one side of the network to the other through capacitor 600 in the junctor circuit.

This situation continues until the marker receives a "disconnect" order, which is accomplished by the address of the junctor that held the connection. In this case, marker outputs En and Fn, addressing junctor 41 are energized. When the disconnect signal RJP appears, the reset input of FF–J41 is energized, and the flip-flop reverts to state "0." In this state, transistor 671 is turned on and saturates. The sustaining current through resistors 621 and 624 is diverted from the PNPN diodes to diodes 613 and 610 and transistor 671. Consequently, the PNPN diodes return to the "off" condition, terminating the connection.

In addition to supplying the positive crosspoint firing potential and holding current, the junctor has the task of supplying ringing and ringback tone to the called and calling subscribers, respectively. The audio path across the junctor must be disabled during the ringing period. This is due to the fact that the system uses telephones with tone ringers, which require an activating signal quite different from the standard ringing tone. The junctor must supply standard ringback tone for any trunk subscriber (MAX). To insure the purity of this tone the audio connection across the junctor is disabled. If a MAX subscriber were to hear the system ringing signal superimposed on ringback tone he could easily misunderstand it to be some sort of a wrong number tone signal.

Ringing tone is applied at conductor 682 on the side of the junctor connected to the called side of the network. Ringback tone is applied to conductor 681 on the other side of the junctor. Ringing tone has a peak-to-peak maximum amplitude which is less than two volts, while ringback tone is considered smaller. The tones have in common the fact that they are superimposed on a +10 direct voltage level. Placing the tones on the line is accomplished by diverting the tones from ground to the junctor output. With transistor 673 saturated, diodes 604 and 611 are forward-biased and the tones are clamped close to ground. To make the tones available at the link, transistor 673 is cut off, removing the ground from diodes 604 and 611. The +10 volts forward biases diodes 603 and 610 and the tones are available to the crosspoint network.

Preventing the tones from being transferred across the junctor is accomplished by reverse-biasing diodes 602 and 609. Normally when it is desired to disable the audio connection across the junctor, the points Lj41L and Lj41R will have a positive potential in excess of +2.5 volts. By saturating transistor 672, the potential at both sides of capacitor 600 is clamped close to ground, and diodes 602 and 609 are reverse-biased. A requirement here is that the value of resistors 622 and 623 be sufficiently small that the diodes 602 and 609 will operate in a linear portion of their characteristics when they are required to carry the audio signals.

The overall operation of the tone gates is as follows. Initially, in the idle state, transistor 673 is saturated and transistor 672 is cut off. Flip-flop FF–R41 is in its reset state.

The command SRP from the marker sets flip-flop FF–R41. As the connection is being established transistors 672 and 673 have changed states as controlled by FF–R41, permitting the tones to propagate to the connected line circuits, and suppressing all transmission across the junctor. The junctor is now in its ringing state. After some time, either the called party has answered the call or the calling party has abandoned it. In either case the marker generates a signal RRP which requires the ringing flip-flop to be reset. The signal RRP is combined with the address of the junctor through AND gate 375 output to reset flip-flop FF–R41. The flip-flop changes state, returning transistors 672 and 673 to their original states. The tones are now not coupled to the talking path, and the subscribers are free to speak.

LINE AND TRUNK CIRCUITS

Figure 7:
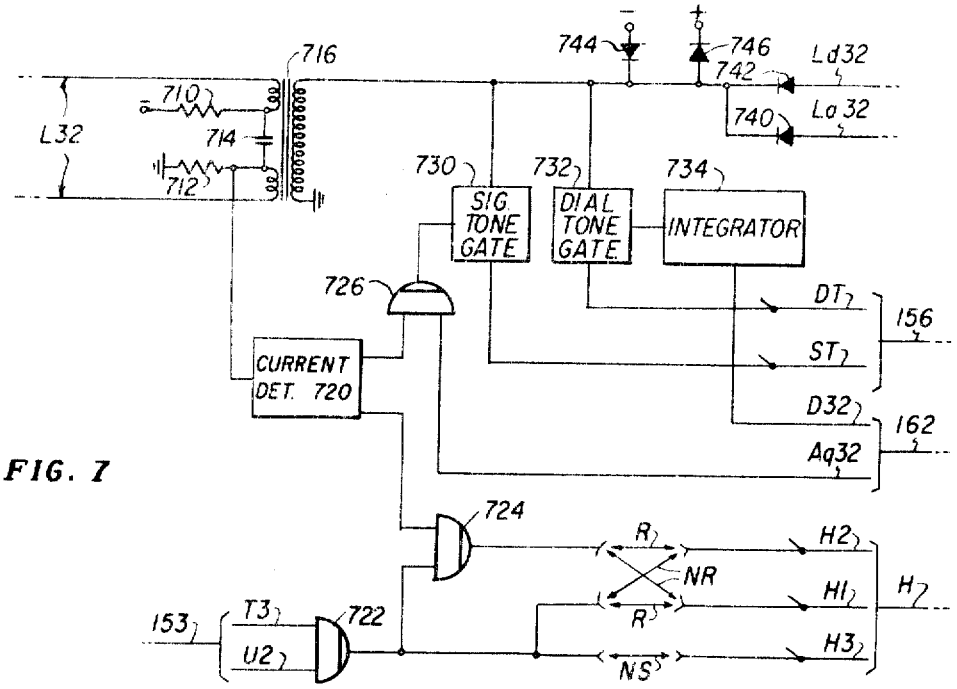

FIG. 7 illustrates a typical subscriber line circuit. The line circuit in this system has several functions in addition to the normal one of providing the termination for the subscriber's line loop. The circuit gives loop supervisory information to the subscriber logic, furnishes dial and busy tone as required, and provides strapping options required to place designated subscribers in special categories.

The resistors 710 and 712, capacitor 714, and transformers 716 form a standard battery feed system for the subscriber's telephone. The two diodes 740 and 742, provide the output connections to the two links La32 and Ld32 to the two sides of the transmission network. For simplicity the remainder of the circuit is shown in block diagram form.

The system control is concerned with the condition of the subscriber's line loop during the time slot assigned to the subscriber. Therefore, the key circuit of the line circuits is AND gate 722, which forms the subscriber's address. Its inputs are the address of the subscriber from the distributor 112.

One of the main uses of this output is in the multiplex highways designated H1, H2, and H3. *The term "highway" as used herein refers to a common conductor connected in multiple to a number of circuits for the transmission of signals. As shown in FIGS. 7, 9, 10 and 11, at least two common supervisory conductors H1 and H2 called highways (and in some embodiments a third common conductor H3), form conductor group H, and are connected in multiple to the line circuits. As shown in FIG. 1, conductor group H is connected at the other end to control equipment 116, and more specifically as shown in FIG. 23 conductors H1 and H2 are connected respectively to flip-flops Hs1 and Hs2 in the control equipment 116.* Highways H1 and H2 are used to inform the common control of the condition of the line loop. To this end, a current-detector 720 is used to sense the flow of current to the telephone. The output of this detector is combined with the address in AND gate 724. Its output can be strapped to either of the two highways. The highway not receiving this output is fed the output of AND gate 722. This strapping option is used as follows. If a subscriber is permitted to dial a trunk call he is connected by strapping NR to modulate his H1 highway, and if he is restricted from this feature he is connected by strapping R to the H2 highway. The common control can thus detect the fact that a subscriber is dialing, whether or not he is restricted, and by appropriate timing logic, the digit dialed. Furthermore, if no output appears on either highway, the common control can conclude that no line equipment occurs at this time slot. This permits the number of subscriber lines in use to be changed simply by adding or removing subscribers' line circuits from the system. The common control automatically senses if a particular address is equipped with a line circuit.

Highway H3 is used to designate a party who is to receive calls during the absence of the operator. This could be a night watchman, night foreman, etc. For this feature the output of AND gate 722 is connected by strapping NS to the highway H3.

Dial tone is applied to the line by means of a tone gate 732 in the line circuit. The common control, during the time slot of a subscriber, generates the signal D, which actuates an integrating circuit connected as the input to the subscriber's tone gate. The integrator 734 sustains the gate in the "on" condition until the next time this subscriber's time slot appears; the signal is then either repeated or absent. The repeated signal keeps the tone gate on maintaining the tone on the line until such time as the common control fails to supply signal D. When busy tone is required, the signal D, is interrupted at the proper rate, and the subscriber accepts the interrupted dial tone as busy tone.

To dial out over a trunk, the system requires that the dial pulses of the telephone be converted to bursts of a tone signal and transmitted to the line circuit of the trunk, where they are reconverted to direct-current loop pulses. When a nonrestricted subscriber dials the code number assigned to signify, that trunk is desired, the control network provides the calling line circuit with signal Aq. This signal is gated with the output of the current-detector in AND gate 726. The succeeding dial pulses become actuating signals for the tone-signalling gate, and tone bursts are sent out as required.

Figure 8:
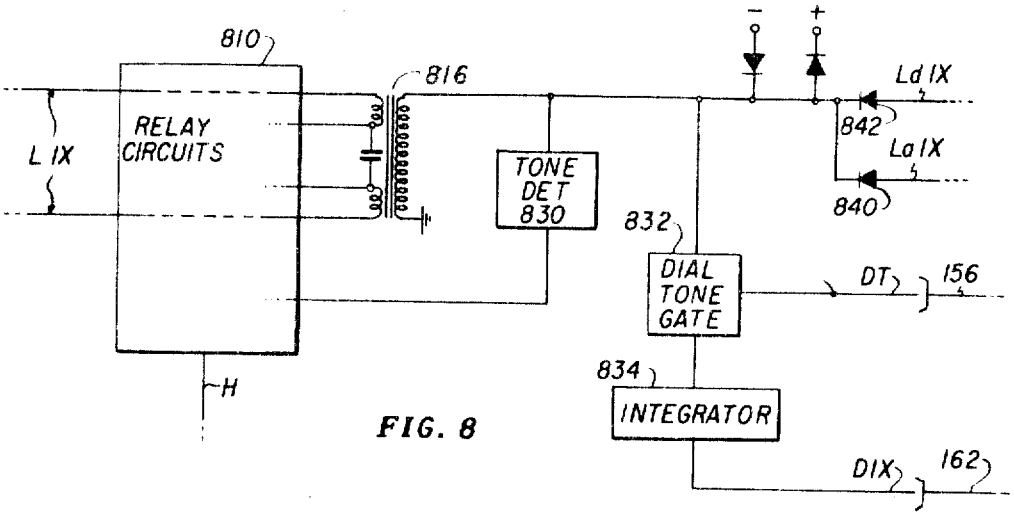

The trunk line circuit shown in FIG. 8 is quite similar to a subscriber line circuit, for as far as the transmission network is concerned the trunk is just another subscriber. As in the standard line circuit, the two diode outputs 840 and 842 to the transmission network are present. The line transformer is present, but the battery feed is removed and contained in a relay matrix 810 which is used to connect the electronic system to the outside trunk lines. The dial- and busy-tone signal control is the same as the standard circuit. Busy tone is required for an incoming trunk call. That portion of the highway information necessary for the trunks is developed in the relay matrix.

The unique circuit on the trunk line equipment is the tone detector 830. The tone detector consists of an amplifier feeding a tuned tank circuit. The output of the tuned circuit is rectified and used to trigger a Schmitt Trigger circuit, whose output is coupled into a relay driver circuit in the relay matrix. The relay is used to pulse out on the trunk lines, and is in a sense an extension of the subscriber's dial.

Figure 9:
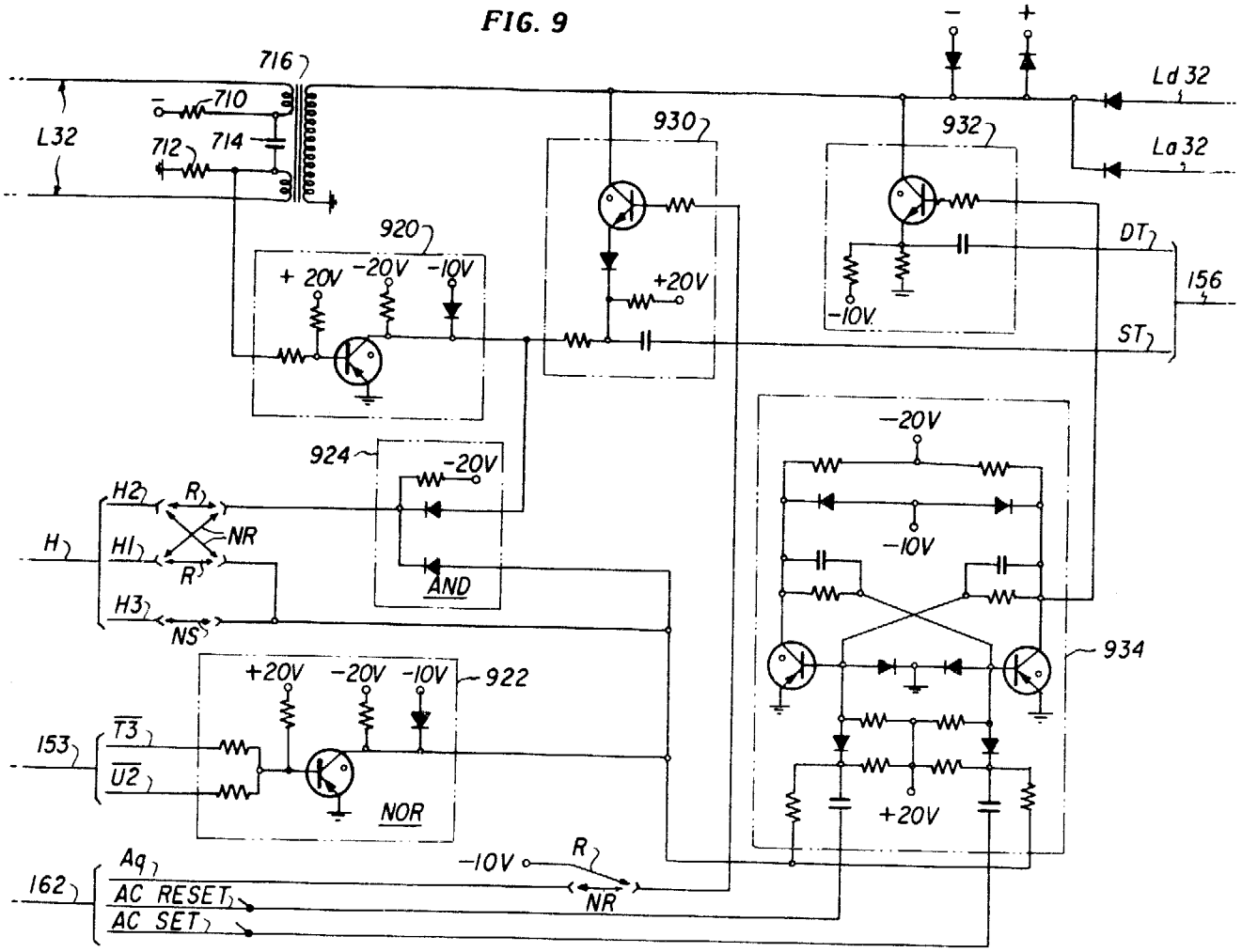

A detailed schematic diagram of a second embodiment of a PABX subscriber line circuit is shown in FIG. 9. Functionally this embodiment produces substantially the same overall result as the line circuit shown in FIG. 7, but there are some differences in detail in the individual circuits. The gate for receiving the signal from the distributor to identify the line's time slot is a NOR gate 922, and the inputs from the distributor are in inverted form. The current detector 920 is an inverter amplifier which is normally in the saturated condition so that with the subscriber on hook the output from detector 920 is at —10 volts, which is a "1" condition. The transistor in NOR gate 922 is normally saturated so that its output is at ground. During the time slot of the line circuit this signal goes to —10 volts. When the subscriber's telephone is on hook, during the subscriber's time slot the signal from gate 922 is coupled directly to highway H1 if it is a restircted line and to highway H2 if it is nonrestricted; and the gate 924 is enabled to supply the output signal [through] *to* highway H2 if it is a restricted line and to highway H1 if it is a nonrestricted line. Thus a line on hook supplies a true signal to both highways H1 and H2 during its time slot. If it is wired for night service the signal is also supplied to highway H3. During the off hook condition, the output signal from 924 does not appear because of the "0" input signal from detector 920. Thus for a nonrestricted line off hook the signal during its time slot on highway H1 is "0" and on highway H2 "1"; and vice versa for a restricted line.

The dial tone gate 932 is a simple transistor amplifier with the control signal applied to its base electrode. Instead of the integrator circuit 734, a flip-flop 934 controlled by signals from the control unit is used. In response to the signal on the highways H, a signal is returned from the control unit, which in conjunction with the D.C. signal from gate 922 sets the flip-flop 934. The output from this flip-flop then actuates tone gate 932 so that dial tone is coupled onto the line and transmitted over the subscriber line L32. The subscriber then proceeds to dial, and if it is a local call to another PABX subscriber, the dialing is repeated as time division multiplex signals over the highway H. If the subscriber is nonrestricted and is making an outgoing call over a dialing trunk, the control unit, in response to the initial digit, sets a flip-flop in the control unit, the output of which is returned as a signal over conductor $\overline{Aq}$ to the signal tone gate 930. During the dialing break intervals, corresponding to an on hook condition, the output from detector 920 if —10 volts which in coincidence with the signal on lead $\overline{Ap}$ actuates the tone gate 930 to place a spurt of the tone from lead ST on the line for transmission through the crosspoint network. If the called line is busy on either the local or trunk call, the control unit causes the flip-flop 934 to be turned on and off so that interrupted dial tone is coupled through gate 932 onto the line, which is interpreted as busy tone.

Figure 10:
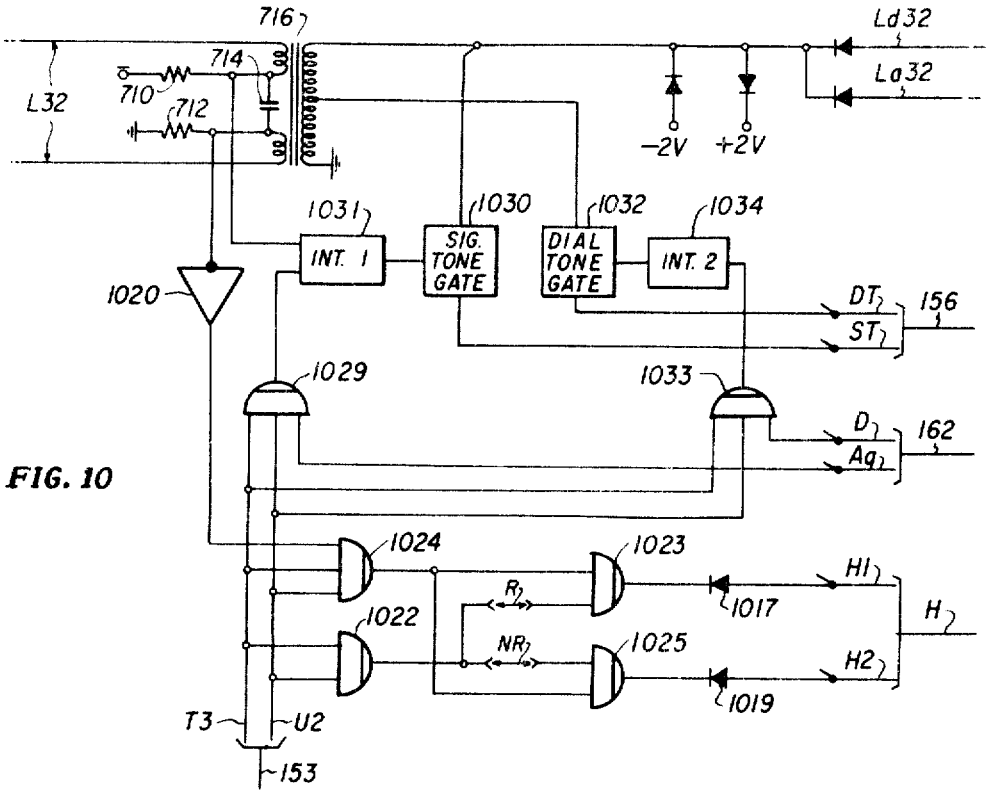

A functional block diagram of a third embodiment of a PABX subscriber line circuit functionally similar to those in FIGS. 7 and 9 is shown in FIG. 10. The current detector 1020 is an inverter amplifier similar to the detector 920 in FIG. 9. The distributor inputs are supplied to AND gates 1022, 1024, 1029 and 1033, to enable each of them during the time slot of the line. When the subscriber is on hook, the output from the current detector 1020 is a "1" and enables gate 1024, so that during the time slot of the line a signal is applied through both OR gates 1023 and 1025 to the two highways H1 and H2. When the subscriber is off hook, the output from detector 1020 is "0" and therefore block gate 1024; however, an output signal appears from gate 1022 which is supplied through gate 1023 to highway H1 if the line is restricted, and alternatively for a nonrestricted line through gate 1025 to highway H2. In any of the embodiments of the line circuits, the input to each of the highways must be supplied through an OR gate having one input per line. As shown in FIG. 10, this may comprise one diode per highway in each line circuit, namely diode 1017 to highway H1 and diode 1019 to highway H2. *FIG. 23 shows how the highway conductors H1 and H2 connected in multiple from the several line circuits are connected to the inputs respectively of flip-flops Hs1 and Hs2 in control equipment 116.*

The control unit upon detecting a service request, applies the signal on conductor D in the time slot of that line. Gate 1033 is enabled during the time slot and therefore gates the signal from conductor D to the integrating circiut 1034. This supplies a signal to enable the dial tone gate 1032 and couple the dial tone signal through transformer 716 to the subscriber line L32. For busy tone signal the TDM pulse signals on conductor D are interrupted so that interrupted dial tone is supplied to the subscriber. If a nonrestricted subscriber is making a trunk call, the control unit supplies a signal on lead Aq in the line's time slot which is gated through gate 1029 to the integrating circuit 1031. There is another input from resistor 710 to the integrator circuit 1031 to repeat the direct current dial signals and enable the signal tone gate 1030 to supply the high frequency tone from lead ST onto the line and through the crosspoint network to the trunk.

Figure 11:
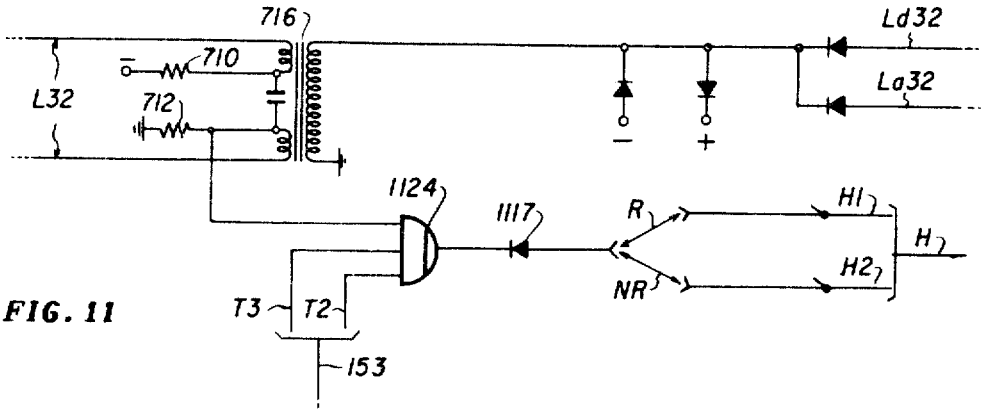
Figure 12:
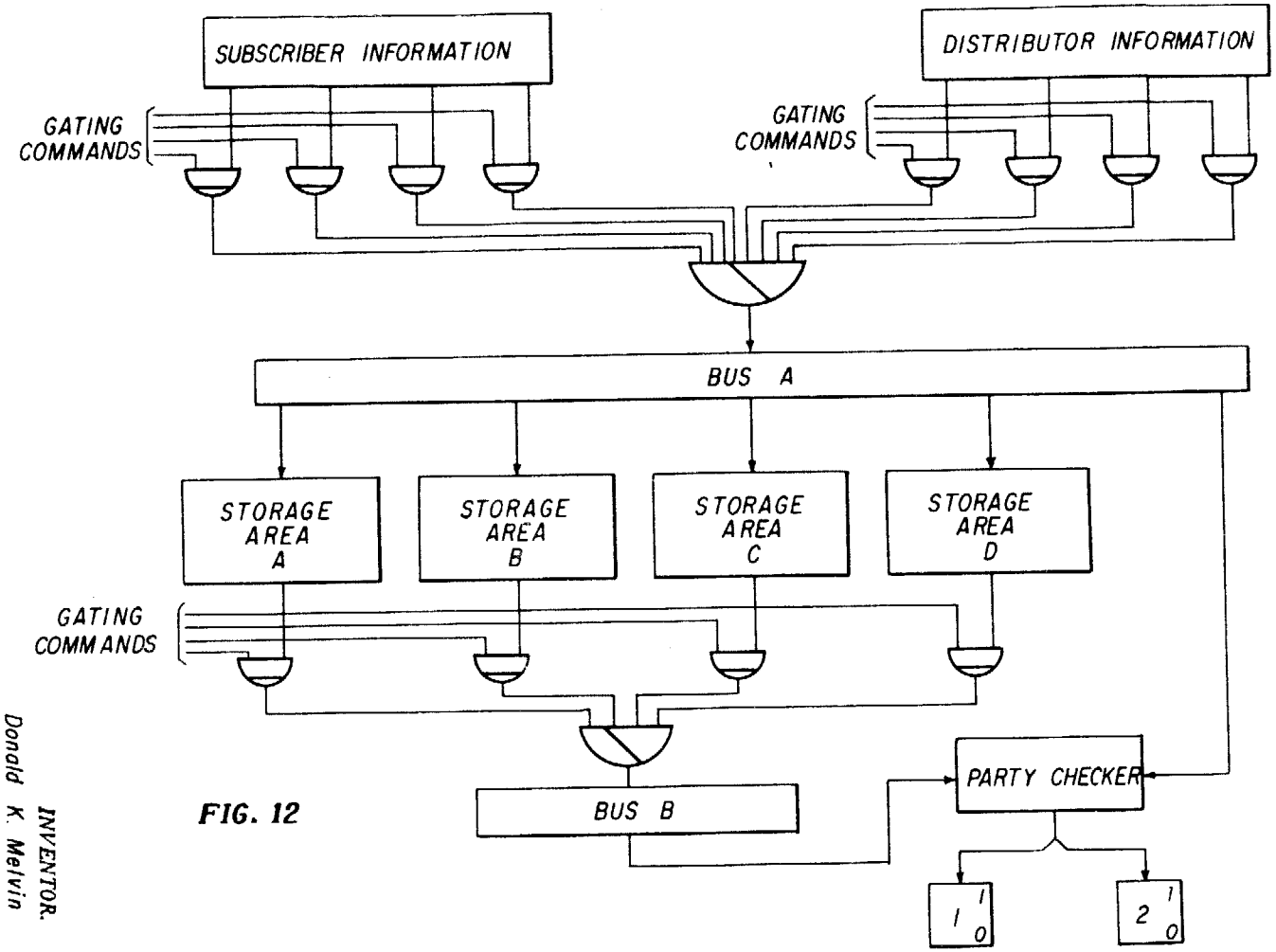

If the code for identifying an unequipped line is not required, the hookswitch supervision arrangement of the line circuit may be simplified, as shown in FIG. 11. An AND gate 1124 has two inputs from the distributor and one input from the resistor 712 of the battery feed circuit. Therefore the output of this gate is "0" when the subscriber is on hook, and during his time slot it is "1" for the off hook condition. For a restricted line this output is coupled through diode 1117 to the highway H1 and for a nonrestricted line to highway H2. Thus for the on hook condition neither highway will receive a pulse signal, and for the off hook condition one or the other highway receives a pulse during the subscriber's time slot according as he is restricted or nonrestricted. The diode 1117 is the input of this line circuit of the OR gate to the highway. With the arrangement shown in this figure only one such diode is required per line circuit. The dial tone and signal tone equipment may be as shown in FIG. 10.

LOGICAL CONTROL

The system (FIG. 1) uses a space-division transmission concept in which a PNPN silicon diode is employed as the crosspoint element within a four-stage switching network 110. Control logic or subscriber logic 116 is shared by subscribers through time-division techniques. A system clock and a logic-distribution network (distributor 112) establish a 16-millisecond machine cycle and subdivision thereof that regulate the multiplexing operation. Pertinent information concerning each subscriber is retained within a ferrite-core memory 114 during the period subscriber logic is not at the subscriber's disposal. The marker 118 is a logic network that is stationary with respect to the time reference established by the distributor, and therefore capable of reviewing the status of each subscriber on a one-at-a time basis. The marker is used to convey information from one subscriber to another and to perform the function from which it derives its name: that of marking the path through the crosspoint switching network that is to be used for a pending connection.

Associated with each subscriber is a line equipment 120 which provides both a termination for his line-loop and an audio link to the crosspoint switching network. The line equipment of local subscribers includes a sensing element that reflects the D.C. status of the line-loop and is, consequently, sensitive to manipulations of the dial and hook switch.

Subscriber Logic

Because there are, in all, 130 lines, or subscribers, within the system, the distributor divides the 16-millisecond machine cycle into one hundred thirty 123-microsecond divisions called time slots. The time slot is further sub-divided into 16 equal intervals of 7.7 microseconds duration each.

In forming time slots, the distributor generates 13 units pulses (denoted U1, U2, U3, . . . U9, U0, Ux, Uy, Uz) of 123 microsecond length and recurring sequentially every 1600 microsecond, and 10 tens pulses (designated T1, T2, . . . T0) of 1600 microseconds duration which recur every 16 milliseconds or, in other words, every machine cycle. A complete units pulse train is contained within each tens pulse. The coincidence of a units pulse and a tens pulse designates a time slot. Time slot 68, for instance, would be generated by the simultaneous occurrence of T6 and U8.

Each subscriber is permanently assigned a time slot during which his status is analyzed by the subscriber logic and reviewed by the marker. The one hundred time slots having units pulses U1–U0 are assigned to local PABX subscribers, the ten time slots having units pulse Ux are assigned to PBX trunks, and the ten time slots having units pulse Uy are assigned to the two-way dial trunks. The four operator lines use the time slots having tens pulses T1–T4 respectively and units pulse Uz, and the six meet-me conference lines use the time slots having tens pulses T5–T0 respectively and units pulse Uz. By interrogating the distributor, the marker may readily discern the identity of the subscriber.

Three separate multiplex highways (H1, H2, and H3) inform the subscriber logic of conditions existing within the subscriber's line circuit. *The signals to highway conductors* H1 and H2 are generated in such a way as to reflect the condition of the line-loop (open or closed) and, as well, the status of a subscriber with regard to trunk restriction. The resulting code appears below.

H1·H2—Idle Line $\overline{H1}$·H2—Unrestricted Subscriber Off Hook

H1·$\overline{H2}$—Restricted Subscriber Off Hook $\overline{H1}$·$\overline{H2}$—Unequipped Line A subscriber line-loop condition, as seen by the subscriber logic, must remain constant for the duration of the time slot in order that all activities occurring within the time slot will be based on the same information. *The signal condition on highway conductors* H1 and H2 are therefore sampled early in the time slot of the subscriber, and their sense retained within bi-stable multi-vibrators (flip-flops) Hs1 and Hs2 [(not shown)], *as shown in FIG. 23* for the duration of the *time-slot* reviewing period.

A third multiplex highway, H3, will exhibit a binary "one" within the time slot of a subscriber designated to be the recipient of incoming PBX trunk calls during night service operation. The signal emanates from the subscriber's line circuit, and its binary value is determined by a strapping option.

As has been noted, *the signals on the highway conductors* H1, H2, and H3 are multiplex quantities. Each of the signals is generated within the line equipment of each subscriber, is associated with the distributor address of the subscriber, and is funneled into the subscriber logic via a logical network which is, in effect, a 130-input OR gate.

Permanently associated with each time slot, and therefore with each subscriber, is a 31-bit memory-word that retains, between reviewing periods, pertinent information concerning the subscriber's activities as follows:

| Bits: | Information |
|---|---|
| **1–3** | Subscriber action. |
| **4–5** | Relationship to marker. |
| **6** | Connected to a trunk. |
| **7** | Last cycle line loop condition. |
| **8–11** | Timer. |
| **12–15** | Digit counter and storage. |
| **16–19** | Digit storage. |
| | Calling party's routing register: |
| **20–22** | "B" switch number. |
| **23–25** | "C" switch number. |
| | Called party's routing register: |
| **26–28** | "B" switch number. |
| **29–31** | "C" switch number. |

The memory-word is read into 31 buffer flip-flops early in the subscriber's time slot; near the end of the time slot the information, as revised by subscriber logic, is written into the memory.

The first three bits of the memory-word form a code which is descriptive of the activity in which the subscriber is engaged. The eight resulting states are designated S1, S2, . . . S8.

S1—Idle
S2—Dialing First Digit
S3—Dialing Second Digit
S4—Dialing Third Digit
S5—Receiving Busy Tone
S6—Connected—Not Talking
S7—Connected and Talking
S8—Disconnecting The next two bits form a second code (Q1, Q2, . . . Q4) that indicates the relationship between the subscriber and the marker.

Q1—Idle
Q2—Demanding the Marker
Q3—Being Serviced by the Marker as a Calling Party
Q4—Selected by the Marker as a Called Party A subscriber who is a called party and has dialed the number of a second subscriber is, if he is not connected to a trunk, attempting to establish a chain call. If, however, the subscriber is presently engaged in conversation over a trunk, the system must react by performing the operations necessary to affect a trunk transfer. It is apparent, then, that the system must be able to discern which subscribers are connected to trunks. Bit six of the memory word serves this end; a binary "one" is stored in bit six whenever a subscriber is involved with a trunk.

Memory bit seven will contain a binary "one" if, during the previous reviewing period, information on the multiplex highways indicated that the subscriber's line-loop was closed. By comparing bit seven to the current status of the line-loop, the transition from open loop to closed loop or from closed to open may be detected.

Bits 9, 10, and 11 form a counter capable of counting from zero to seven. Although the counter has been adapted to other uses, its primary function is to determine the length of time between changes in line-loop condition during states S2, S3, and S4 in which dialing activity occurs. The counter begins to count when the first change in the loop condition is detected and advances one count every machine cycle that the line-loop status remains unaltered. When the line-loop condition changes before the counter reaches a count of seven, the counter reverts to a count of one and begins to count again. When counting in this mode, the realization of a count of seven generates the intermediate quantity Qs1. This signal is interpreted as meaning that the line-loop condition has remained unchanged for a period of 16 milliseconds times seven, or 112 milliseconds. The maximum make or break period occurring during a dial pulse train is approximately 60 milliseconds. Therefore, Qs1 can never become true (be generated) until the pulse train is completed. When Qs1 is generated, assumptions may be made regarding the subscriber's action, based on the binary value of bit seven at the time.

P7·Qs1—A dial-pulse train has been completed and the subscriber is pursuing the call.

$\overline{P7}$·Qs1—The subscriber has hung up.

A mark is placed in bit eight whenever it becomes desirable to cause the counter of bits 9–11 to perform a special counting operation. It is necessary, for instance, to cause the system to disregard the dialing activity of a subscriber who has obtained a trunk and is outpulsing. The subscriber is allowed a given period of time to accomplish this activity. This relatively long counting operation is regulated by bit eight.

Memory bits 12, 13, 14, and 15 are grouped to form a counter capable of counting line-loop interruptions generated by the subscriber's dial. The counter adds one each time a transition from open loop to closed loop occurs. The count continues until Qs1 becomes true, denoting the end of a dial-pulse train. The counter is coded in binary form with 8–4–2–1 weighting. The dialed hundreds digit, since it is an access digit, is discarded when its value has been determined. At the completion of the tens pulse train, the digit is transferred from the counter to bits 16, 17, 18, and 19 for storage. The pulses which comprise the dialed-units digit are then counted, as were dialed hundreds and tens. The units digit is stored within the counter. Dialed digits are retained in their storage areas for only the duration of their usefulness.

The crosspoint address of a connection in which a subscriber is engaged is stored in bits 20–31. The address may be defined as the number of the B switch and the number of the C switch used to connect the two subscribers (FIG. 3). This is identical to the number of the junctor used to establish the connection. The crosspoint address of a connection is stored within the calling party's register in bits 20–25. The first three bits of this group record the number of the B switch; the last three bits identify the C switch. A called party must refer to bits 26–28 and bits 29–31 to obtain the numbers of the B and C switches, respectively, through which his audio path is established.

Information within routing storage areas is written and erased under the influence of the marker during connection and disconnection cycles respectively.

Two important intermediate quantities are used extensively to describe a subscriber's status. Ls, which denotes a calling party, is generated when information is found to be stored in bits 20–25. Rs is true if a subscriber is a called party (if he has information within bits 26–31 of his memory word).

The common control logic, or subscriber logic, is a logical network that converts the memory word of each subscriber into a form indicative of the condition of the subscriber. It acts upon this information, multiplex highway information, and marker information, in such a way as to determine what information should be written into the memory at the end of each time slot. Subscriber logic acts upon the memory word of each subscriber in turn during his assigned time slot.

The subscriber logic also exchanges information with the marker. To insure that the marker is not called upon to perform impossible or disallowed actions, the subscriber logic discerns which subscriber demands are to be acted upon.

Certain supervisory signals (busy tone and dial tone) are supplied to subscribers via their line equipment. Subscriber logic regulates the application of these signals.

Special "subscribers"—such as trunk and attendant lines—require special control and supervisory features not provided normal PABX subscribers. The inclusion of these features necessitates an expansion of the memory words of these lines, as well as the development of additional logic networks.

The Marker

The marker, in satisfying the demands of subscribers, may assume any one of 18 states. The state of the marker at a particular time determines its reaction to input signals. A number of flip-flops are used to record the state under whose influence the marker is acting.

It is essential that the framework of the marker include a number of storage areas, and that information be absorbed into these areas, processed, and discarded as a systematic response to predetermined conditions.

FIG. 12 is a symbolic flow diagram depicting the form of the principal storage areas within the marker. Information from sources external to the marker is allowed to reach Bus A when the explicit conditions of the gating commands are fulfilled. The information on Bus A is made simultaneously available to the flip-flops that comprise storage areas A, B, C, and D and can be absorbed into any or all of the storage areas whenever it is expedient to retain it.

Just as information from external sources was made available to the marker by placing it on Bus A, so information stored within storage areas A, B, C, and D is presented to the parity-checker by gating it onto Bus B at the proper time.

The parity-checker is a logic network that compares two binary digits, and yields an output signal whenever the input from one source (Bus A) is identical to the information supplied by a second source (Bus B).

The principal use of the parity-checker is to enable the marker to seek out a particular time slot, by one of two methods. One method is based on the fact that a called party's number as dialed by the calling party is identical to the called party's distributor address. Consequently, if the dialed-tens and dialed-units digits, as recorded in the calling party's register, are stored in storage areas B and C respectively, and are gated to the parity-checker via Bus B coincidently with the distributor tens and units encountered during each time slot in turn, the called party will be recognized by a parity-checker output both during the time dialed tens and distributor tens are being compared and while dialed units and distributor units are being compared.

Another method of time slot location is used to find the time slot of the party to whom another party is connected. Within each subscriber's register is recorded the crosspoint address of each connection in which the subscriber is currently participating. Thus by storing in the marker the crosspoint address of a connection and searching for a time slot in which is displaced an identical crosspoint address, the party to whom another party is connected may be located.

Because both of these methods of locating time slots depends upon the performance of two distinct parity checks during each time slot, and because the output of the parity checker persists only as long as the input signals remain identical, the results of an individual parity check must be preserved for the duration of the time slot. Two flip-flops are employed to retain parity decisions, one being set if the first evaluation produces an output, the second flip-flop responding to the second parity check.

Because the parity circuitry operates constantly, an output is developed when no information appears on both buses. Therefore, the output of the parity checker must be used judiciously. The indiscriminate setting of the parity flip-flops is prevented by explicitly specifying the conditions under which they may be set.

Connections

When the marker is idle and encounters the time slot of a subscriber who has completed dialing three digits (corresponding to the telephone number of a second subscriber), it must perform a series of operations that will result in the establishment of an audio connection between the two subscribers.

Before concerning itself with the problem of establishing the connection, the marker enters a 16-millisecond busy-test cycle which will determine if the called party is available. Before leaving the time slot of the calling party, the marker absorbs into its storage areas the last two digits dialed by the calling party. These digits correspond to the distrubutor address (time slot) of the called party. Through the use of its parity-checking apparatus during the subsequent review of time slots, the marker can identify the time slot of the called party and, by analyzing the memory word of the subscriber, determine if he is free to become a called party. No further action occurs until the calling party's time slot is again encountered.

When the question of subscriber availability has been resolved, the marker must concern itself with the selection of an available route through the crosspoint network which will link the two subscribers. Referring to FIG. 3, it is apparent that in order for a connection to be available from, for instance, subscriber 32 to subscriber 68, links must be free from switch XA3 to a B switch, from switch XD6, to a C switch, and from the chosen B switch to the chosen C switch.

The route-search cycle begins at the end of the time slot of the calling party, and persists for a complete machine cycle. During the cycle, the marker inspects the memory word of each subscriber within the system, and notes which B switches and which C switches are in service. B switches currently in use by subscribers who are served by the same A switch as the calling party are listed by the marker as unavailable for the proposed connection. Similarly, C switches being used by subscribers of the same D switch as the called party are noted as being unavailable. During the cycle the transmission network supplies the marker with information regarding junctor availability so that, when the time slot of the calling party is again reviewed, the marker has determined which, if any, routes may be employed in establishing the required connection and which one, if more than one are free, is to be used.

Immediately following a successful route-search cycle are two complete machine cycles, during which the marker instructs the crosspoint switching network as to the crosspoint route that must be activated. During these cycles the marker informs the subscriber logic of the nature of the connection, in order that the memory words of the participating parties may be revised accordingly. At the completion of these cycles the marker returns to the idle condition. The process of establishing a connection has taken a total of 48 milliseconds.

The Hunting Sequence

Whenever the marker is called upon to connect a subscriber to any one of a group of lines (as in the case of a subscriber calling a trunk) the marker must select not only an idle member of the group but one to which a free transmission path exists as well. Each type of line-hunting activity is characterized by a search for a line fulfilling criteria based upon some quality of the peculiar class of lines. A search for a trunk will culminate in the discovery of a time slot designated by Ux or Uy, because only trunks are assigned these locations. A time slot exhibiting H3 would satisfy the marker when searching out a line to which to connect an incoming PBX trunk call during night-service hours. Of course any line to be selected must be idle.

Another factor that is a part of the criteria common to all hunting operations must also be considered. Once the marker has selected a particular line to which it will attempt to discover a free route, it must become insensitive to other lines which might satisfy the basic conditions of the search. When the marker enters the hunting state, a flip-flop, Im (not shown) is set. The flip-flop remains set only so long as the marker is unable to locate a subscriber fulfilling the hunt criteria. When a line is selected, the flip-flop is reset; this prevents the marker from actively continuing the hunt.

When a line has been selected as a prospective called party, and its distributor address absorbed into the marker, the marker returns to the time slot of the calling subscriber and enters a route-search cycle. If successful, the marker instructs the transmission network to establish the connection. If, however, the route search is unsuccessful and no free route is found, the marker re-enters the hunting state and attempts to select another line for use as a called party. It must now pass over the line that was previously selected. To accomplish this, every line, upon being selected as a called party, is acted upon to display state Q4. The common criteria which must be fulfilled in order for a line to be selected as a called party during a hunting action have now been expanded to include:

(1) The line must be idle.

(2) The marker must not have previously selected a line during the same hunt sequence.

(3) The line must not have been previously selected during the same call.

The use of the Im flip-flop as the device that allows the marker to actively search proves advantageous; if no line is selected during the hunting cycle, Im will still be true when the calling party's time slot is encountered—a condition that indicates to the subscriber that the desired connection is unobtainable.

ESTABLISHING CONNECTIONS

General

Figure 13:
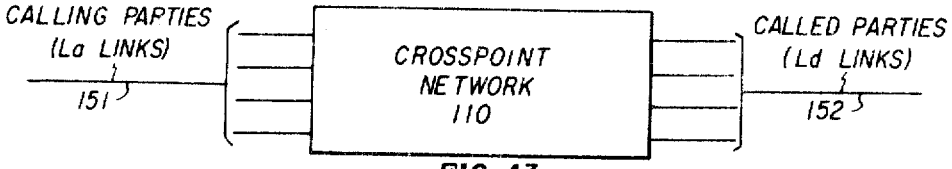
Figure 14:
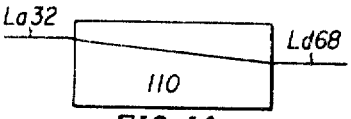

The means for establishing the various connections can be shown by depicting the network in a simplified form, as in FIG. 13. All the line equipment associated with PABX subscribers, operator positions, and trunks is physically tied to both sides of the switching network, by an La link on the calling side and an Ld link on the called side. Therefore, a caller may act as either a calling or a called party, as a calling and a called party, or neither (handset on hook). Also, no subscriber is permitted to have more than one left- or right-hand connection at a time. A connection is established when there is a path through the switching network and there is a calling party tied to the left end of the path and a called party tied on the right. With the above criteria established, a description of the different types of connections follow. A scheme of pictorial representation of the network 110 in the various connections is used.

Local Connection

Let us assume that local subscriber L32 (calling party) wishes to call another local subscriber L68 (called party). When the calling party removes his handset from the cradle, the common control subscriber logic will review his status and, if conditions are proper, will order that dial tone be returned to the subscriber to direct him to commence dailing.

By dialing the access digit "6" a PABX subscriber makes known to the subscriber logic that he wishes to make a local call. Upon dialing the second and third digits, which represent the "tens" and "units" of the called party's address, a demand for marker action is established. If the subscriber meets all conditions as an eligible party, the marker will locate, route, and establish a connection. The calling party will be connected on the left- and the called party will be connected on the right-hand side of the switching network. The connection can be shown as in FIG. 14.

Ringback tone and ringing frequency will be returned to the calling party and called party respectively. After the called party L68 answers, he will have established an audio connection through the crosspoint network to calling party L32.

Outgoing Trunk Call

Let us assume that local subscriber L32 (calling party) wishes to make a call over trunk L1x (called party). If the calling party has a restricted status and attempts to be connected to a trunk by dialing the access digit "9," he will be routed to the operator. If the calling party is unrestricted and he is not already connected on the left as a calling party, he may dial the access digit to request a trunk. The subscriber logic will then direct the marker to locate the first available trunk (it can be either a PBX or a two-way dial trunk) and establish a connection.

Figure 15:
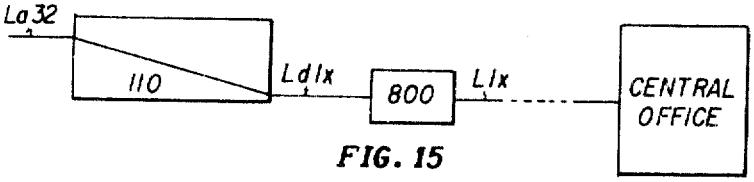

After the connection is made by the marker, the trunk loop will be closed causing the distanct central office (MAX) to be seized. Dial-tone will be returned to the calling party. Also, a tone gate in the calling party's line circuit will be energized to permit a high-frequency tone, under the control of his dial, to pass through the transmission network. This interrupted high-frequency tone is detected in the selected trunk's line circuit and converted to direct-current pulses (similar to standard dial pulses) for pulsing a relay to open and close the trunk loop. Upon dialing the seven-digit address of the distant MAX an audio connection is established. The left- and right-hand connections and the transmission path are shown in FIG. 15. The trunk circuit 800 is shown in FIG. 8.

Inward Trunk Call

Let us assume an incoming call from a two-way dial trunk L1x (calling party) to a PABX subscriber L32 (called party).

Figure 16:
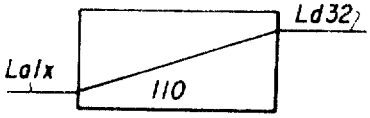

Since these trunks are accessed by the PABX via the fifth selector in the Strowger step-by-step central office, only the last two digits will be pulsed into the PABX relay trunk-adapter. These last two digits will be recognized by the PABX as the "tens" and "units" of the desired called subscriber. If the called subscriber L32 meets the required conditions, he will be connected as shown in FIG. 16.

Transfers

The type of industrial or commercial concern that would require the facilities of a PABX would most probably be one in which areas of specialized activity would be found isolated from one another. Business calls over either two-day dial trunks or PBX trunks might very well be of such a nature as to require the participation of representatives in more than one location. It is for this reason that transfer facilities were included within the framework of the PABX.

Any PABX subscriber may transfer the trunk to which he is connected, to any other PABX subscriber within the exchange or to the operator, simply by dialing the number of the second party.

Assume that a subscriber L32 has called one of the trunks L1x as shown in FIG. 15. A conversation is in progress and it becomes desirable to transfer the trunk to a second subscriber L68. (In FIG. 17, the solid line indicates the existing connection, the dotted line shows the proposed connection.) In order that either L32 or L68 might be capable of removing themselves from the conversation without isolating the trunk, the new party L68 must be associated with the trunk and not with L32. Effectively, the trunk will be the calling party although party L32 will physically dial the number of party L68. In this case the proposed connection may be readily established, since there is no connection to L1x on the left side of the matrix, i.e., L1x is not a calling party.

When the party on L32, has completed dialing the number of line L68, the marker analyzes the situation and concludes that a transfer is required. It absorbs from L32's time slot the digits dialed from L32 and, as well, the transmission address describing the connection between L32 and the trunk L1x. The marker reviews time slots until a memory word is found which exhibits a routing address identical to that of L32. This will, of course, be the time slot of the trunk L1x. Now that the marker is cognizant of the distributor address of the trunk, the trunk may be treated as a calling party. The marker will perform the busy test, route search, and connection activities performed in the establishment of normal calls.

Assume, now, that conditions exist as depicted in FIG. 16. In this case the trunk L1x has called subscriber L32. If transfer action is desired, difficulties are evident. The second local subscriber L68 to whom the trunk is to be transferred must be connected directly to the trunk as a called party. But the trunk, in this case, has already been connected as a calling party. Therefore, the immediate problem is to reverse the relationship between L32 and the trunk, that is, cause L32 to become the calling party and L1x the called party. The trunk will then be capable of acting as a calling party in establishing the new connection to L68.

Figure 18:
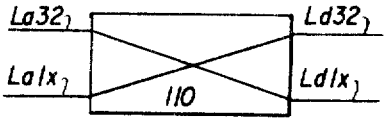

Before the connection depicted in FIG. 16 is destroyed, a new connection between L32 (calling party) and L1x (called party) should be established (as shown in FIG. 18) to insure that L32 and L1x remain continuously connected.

Figure 19:
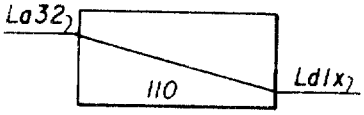

As soon as L32 demands the services of the marker, it is apparent to the marker that a pre-transfer operation must take place. Line L32 will act as the calling party of a connection between himself and trunk L1x. The only difference between the establishment of this connection and that of any other is that the busy-test sequence must be replaced by a cycle that will provide the marker with the distributor address of the trunk to whom L32 is connected. To achieve this end, the marker extracts the crosspoint-routing information which L32 and L1x have in common from L32's time slot, and reviews time slots until the memory word of L1x is encountered. The marker then seizes L1x's distributor address as being that of the called party. Normal route-search and connection cycles follow. At the end of the connection cycle, the marker initiates a disconnection action to remove the connection between L1x and L32 in which L1x is the caller (FIG. 19). Subscriber logic acts upon the memory word of L32 in such a way as to redemand the marker. This time, when the marker investigates the status of L32, it will see fulfilled the conditions which require the normal transfer process.

Figure 17:
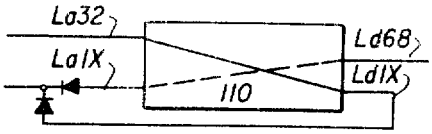

After the dialing of L68's number, the new connection will be as shown in FIG. 17, by both the solid line and the dotted line. This condition is acceptable to the PABX, that is, the trunk L1x has only one connection as a calling party and one connection as a called party.

When a connection is made as shown in FIG. 17, the trunk L1x is silenced. If subscriber L68 does not answer, subscriber L32 can dial the digit "2" (which will "un-silence" L1x) and notify him of L68's condition.

Figure 20:
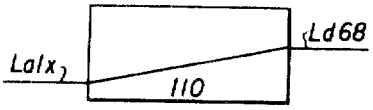
Figure 22:
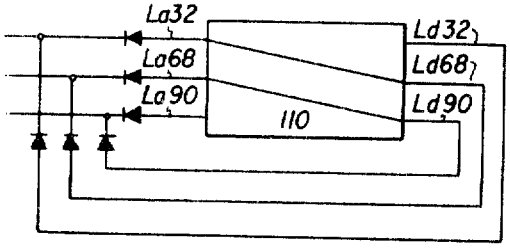

If subscriber L68 does answer L32, and agrees to talk to L1x, then L32 can simply remove his connection by hanging up. This action by L32 will destroy L32's connections to L1x and will also un-silence L1x. The connection will be as shown in FIG. 20.

If the incoming trunk call had been a PBX trunk the actions would be similar, except that incoming PBX trunks are seized by the attendant. The transfer operations would be the same as performed by called party L32. If the incoming PBX call had been received in the absence of the attendant, then the night service key on the attendant cabinet would be operated, and the call would be automatically routed to a local PABX subscriber wired for night service. The answering and transfer actions would then be very similar to those of the incoming two-way dial trunk connection.

Meet-Me Conference Call

Figure 21:
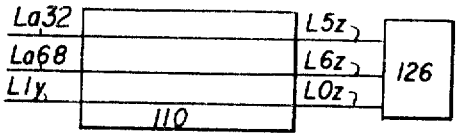

There are six conference lines; these are passive lines and are tied to only the right-hand side of the network. Also, the operator position can be tied to a conference by operating her conference key. Again, the operator is always aware of a conference in progress by a conference light lit on her cabinet even though she may not be connected. The conference lines are connected as shown in FIG. 21.

As can be seen, the conference lines may act only as called parties, since they are tied only on the right of the network. Since the secondaries of the conference transformers are paralleled in unit 126, six independent calls or the operator or the operator-connected trunks can have an audio connection to a conference circuit. All callers will be considered as calling parties and will be connected on the left.

By dialing the access digit "8," PABX subscribers are connected to the "meet-me" conference circuit. As soon as the first conference circuit is connected, the conference light on the attendant's cabinet will light as a signal that the conference circuit is in use. The connections on the left and the right of the switching network can be shown as in FIG. 21.

Progressive Conference or Chain Call Connection

Let us assume that PABX subscriber L32 calls PABX subscriber L68 and PABX subscriber L68 calls PABX subscriber L90, etc. This type of connection is a means of tieing a number of subscribers together progressively.

PABX subscriber L32 calls subscriber L68, as explained previously in a local call. Since L68 is connected only on the right, as a called party, he is eligible as a calling party if he desires. Subscriber L68 calls subscriber L90 by dialing L90's number. Subscriber L68 is now connected as a called and calling party, that is connected on both the right and left. The chain of a progressive call connection can be shown as in FIG. 22. Subscriber L90 can call another subscriber, etc.

These types of chain calls can be broken in the middle of the chain and have two independent audio connections if there are enough subscribers in the chain. For example, in a chain involving A, B, C, D, and E in that order; subscriber C can hang up and a connection will still exist between A and B, and D and E. If B had hung up, A would also have to, but there still would be a chain connection between C, D, and E.

Disconnect

Basically, the exchange utilizes the principles of calling party release, that is, only the party establishing a connection may cause that connection to be removed. The role of the marker during a disconnection action is two-fold. It must inform the crosspoint switching network of the transmission-path to be extinguished. It must also, during the time slots of the participating parties, inform the subscriber logic of the action, in order that the memory words of the subscribers might be revised.

The only information required by the marker to effect disconnection is the number of the route through the switching network that links the two subscribers (as recorded in each subscriber's memory word).

While I have described above the principles of my invention in connection with specific apparatus, it is to be clearly understood that this description is made only by way of example and not as a limitation to the scope of my invention.

What is claimed is:

1. In a communication switching system in which a switching network is provided for selectively establishing connections between any one of a plurality of originating paths and any one of a plurality of terminating paths, a plurality of line circuits, each line circuit being associated with one originating path and one terminating path, a time diviison multiplex arrangement comprising common control equipment including a memory and logic circuits, at least two common supervisory signal leads connected between the common control equipment and all of the line circuits, a source of cyclically recurring pulses supplied to the memory, to the logic circuits, and to the line circuits to associate the logic circuits with the line circuits and the memory during time slots individual to the line circuits, an individual signal arrangement in each line circuit with output connections to said common signal leads and enabled by said source of pulses during its individual time slot, each line circuit including means for supplying on-off hook supervisory signals to its signal arrangement, and class-of-service designating means also connected to its signal arrangement to cause the signal arrangement to respond to pulses from said source to selectively supply either a first or a second signal to each of said signal leads during the corresponding time slot, with the combination of signals on the signal leads dependent on the supervisory state comprising jointly the on-off hook condition and the class-of-service designation of the line circuit.

2. In a communication switching system, the combination as claimed in claim 1, wherein the said class-of-service designating means of each of said line circuits includes an optional connecting arrangement for designating said line circuit as restricted or non-restricted, and wherein said switching system is partially equipped so that for some of said time slots there is no line circuit connected to said common signal leads, wherein said supervisory states comprise (1) on hook, (2) unrestricted line off hook, (3) restricted line off hook, and (4) unequipped line.

3. In a communication switching system, the combination as claimed in claim 2, further including a third common supervisory signal lead connected between the common control equipment and all of the line circuits, and in each line circuit said signal arrangement includes an optional connection and means for designating whether or not the line circuit is to provide night service.

4. In a communication switching system, the combination as claimed in claim 2, wherein each of said line circuits further includes a tone gate having an output connection to the originating path associated with that line circuit, input connections to said tone gate from a source of signalling tone, from the source of on-off hook supervisory signals, and from an enabling circuit arrangement having a connection from said common control equipment, so constructed and arranged that in response to an enabling signal from the common control equipment and to an on hook signal representing dial pulses, spurts of signal tone are transmitted through said switching network to a selected terminating path.

5. In a communication switching system, the combination as claimed in claim 4, wherein each of said line circuits further includes a second tone gate having an output connection coupled to the associated line, and input connections from a source of dial tone, and from an enabling circuit having a connection from the common control equipment, so constructed and arranged that in response to a control signal from the control equipment, dial tone is transmitted through the second tone gate to the associated line.

6. In a communication switching system, the combination as claimed in claim 5, wherein said common control equipment includes an arrangement for interrupting the control signal to said second tone gate, so that interrupted dial tone is transmitted to the associated line.

7. In a communication switching system, the combination as claimed in claim 6, wherein said connections from the tone gate enabling arrangements to the common control equipment comprise respective common conductors, and wherein the respective tone gate enabling signals from the common control equipment are transmitted in said time slot of the line circuit; integrating means in each line circuit, said integrating means being actuated by coincidence of the cyclically recurring pulses and said tone enabling signals occurring during the time slot of that line circuit to thereby enable the respective one of said tone gates.

8. In a communication switching system, a combination as claimed in claim 1, wherein each line circuit has an individual tone gate for coupling dial tone signals from a source to the associated line, said signal arrangement being effective for transmitting service request signals from the line circuit to the common control equipment, means in the common control equipment in response to a service request for supplying an enabling signal to the tone gate of the corresponding line circuit to thereby enable the tone gate to transmit dial tone to the associated line, and means in said common control equipment in response to another circuit condition for supplying an interrupted control signal to the tone gate of a line circuit to thereby cause interrupted dial tone to be supplied to the associated line.

9. In a communication switching system in which a switching network is provided for selectively establishing connections between any one of a plurality of orignating paths and any one of a plurality of terminating paths, a plurality of line circuits, individually associated with subscriber lines, each line circuit being associated with one originating path and one terminating path, a plurality of trunk circuits connected between individual terminating paths and individual trunk lines, common control equipment including a memory and logic circuits shared on a time division multiplex basis by the line circuits, common supervisory signal means connected between the common control equipment and all of the line circuits, a multiplex arrangement for associating each line circuit with an individual pulse time slot, each line circuit having an individual signal gate arrangement with an output connection to the common signal means, means for supplying cyclically recurring pulses to enable said gate arrangements to cause each line circuit to supply supervisory control signal information during its time slot over the common signal means to the common control equipment, each line circuit including an individual tone gate for coupling a source of alternating current tone signals to the associated originating path, each trunk circuit including a tone detector coupled to the associated terminating path, an enabling circuit arangement connected between the common control equipment and the signal tone gate of each line circuit, means in the common control equipment responsive to a given supervisory signal condition from the line circuit for supplying a control signal over said enabling arrangement, means in the line circuit responsive to the said control signal for actuating its tone gate to repeat loop closure signals on the associated line as spurts of tone to the originating path over an established connection to the terminating path of a trunk circuit, means in said trunk circuit including its tone detector for repeating the tone spurts received at its terminating path as supervisory signals over the associated trunk line.

*10. A communication switching system comprising a plurality of line circuits and a switching network, means associated with each line circuit to produce a multi-element binary code signal which indentifies the class of service given to that line, control means for controlling the extension of calls through said switching network under the control of sequential timing signals, a plurality of supervisory signal conductors common to said line circuits and effective to bypass the switching network for passing the binary elements of the code signals to the control means over respective ones of the supervisory conductors, and means effective during a given interval designated by said sequential timing signals to receive said code signals in the control means.*

*11. A communication switching system as claimed in claim 10, wherein said control means includes a plurality of storage units, each of which includes a plurality of bistable storage devices, wherein said sequential timing signals provide a plurality of time slots which sequentially identify and enable said storage units to store information which includes the class of service of a line in accordance with said code signals received by the control means.*

References Cited

The following references, cited by the Examiner, are of record in the patented file of this patent or the original patent.

UNITED STATES PATENTS

| | | | |
|---|---|---|---|
| 2,649,505 | 8/1953 | Ransom et al. | 179—15 |
| 2,773,934 | 12/1956 | Trousdale et al. | 179—15 |
| 2,830,125 | 4/1958 | Elliott | 179—15 |
| 2,968,697 | 1/1961 | Rager | 179—15 |
| 3,033,935 | 5/1962 | Melvin | 179—15 |
| 3,050,589 | 8/1962 | Vaughn | 179—15 |
| 3,065,307 | 11/1962 | Talcott | 179—15 |
| 3,133,157 | 5/1964 | Platt et al. | 179—18 |

KATHLEEN H. CLAFFY, *Primary Examiner.*

ROBERT H. ROSE, WILLIAM C. COOPER, *Examiners.*

W. L. LYNDE, *Assistant Examiner.*